June 2, 1953 T. H. KINMAN 2,640,901

PHOTOELECTRIC SEMICONDUCTOR DEVICE

Filed May 28, 1951

Inventor:
Thomas H. Kinman,
by Paul A. Frank
His Attorney.

Patented June 2, 1953

2,640,901

UNITED STATES PATENT OFFICE 2,640,901

PHOTOELECTRIC SEMICONDUCTOR DEVICE

Thomas H. Kinman, Rugby, England, assignor to General Electric Company, a corporation of New York Application May 28, 1951, Serial No. 228,568
In Great Britain June 6, 1950

1 Claim. (Cl. 201—63)

Figure 1:
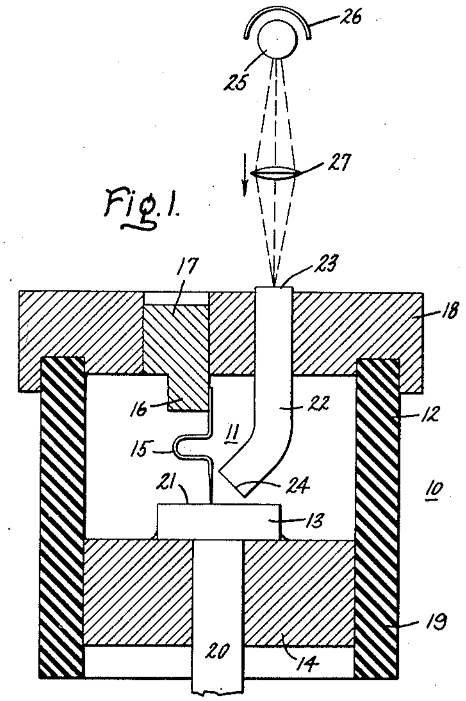

My invention relates to photoelectric apparatus, and more particularly to photoelectric apparatus employing the photoelectric effects observed in point contact semiconductor units.

When a piece of semiconductor material such as silicon or germanium is brought into contact on one face with an electrically conducting base electrode and at another face with an electrode providing point contact therewith, the resulting device has become known as a point contact semiconductor unit. Such point contact semiconductor units are useful as rectifiers since they possess the property of allowing the passage of electrons in one direction in preference to the other direction in response to an applied potential. They are also useful as photoelectric devices since they possess both photovoltaic and photoconductive properties, promoting an electron flow through the point contact when the region of contact is subjected to the influence of light. The flow of electrons between a first point contacting electrode and the semiconductor material may also be influenced by the presence of a voltage applied to an additional electrode also making a point contact with the semiconductor at a point close to that of the first electrode. By this means an amplifying effect can be obtained, and such semiconductor amplifier units have become known as "transistors."

In order to minimize the effects of humidity and other atmospheric conditions and as well as to maintain stable contact between the semiconductor piece or wafer and the point contacting electrodes, it is usually desirable to enclose such rectifiers or transistors in a housing which is hermetically sealed after an optimum adjustment of the electrode contact pressure. This enclosure of the device has heretofore made it quite difficult to utilize these devices as photoelectric elements because of the mechanical and optical problems involved in concentrating the light through the housing upon the germanium only in the neighborhood of the point contact desired to be illuminated. This is particularly true in the case of transistors where the two point contacting electrodes are usually spaced in close proximity with each other.

Accordingly, an object of my invention is to provide photoelectric apparatus of the encased point contact semiconductor unit type in which improved means are provided for directing light to the desired small area of illumination for the efficient utilization of the photoelectric effects in such units.

In general, in accord with my invention, I employ a rod or pipe of light guiding and transmitting material such as quartz or acrylic plastic, one end of which is located close to the point of contact between the electrode and the semiconductor wafer while the remote end is located exterior to the casing in which the semiconductor unit is enclosed. The casing or housing may thus be hermetically sealed around the light transmitting rod while light may nevertheless be directed or focused upon the point contacting region of the semiconductor from a source located outside the casing through the medium of this rod or pipe.

The novel features which I believe to be characteristic of my invention are set forth in the appended claim. My invention itself, however, together with further objects and advantages thereof may be better understood by reference to the following detailed description taken in connection with the accompanying drawing in which Fig. 1 is a cross sectional view of a photoelectric semiconductor diode embodying my invention while Fig. 2 is a similar cross sectional view of a photoelectric semiconductor triode or "transistor" embodying my invention.

Figure 2:
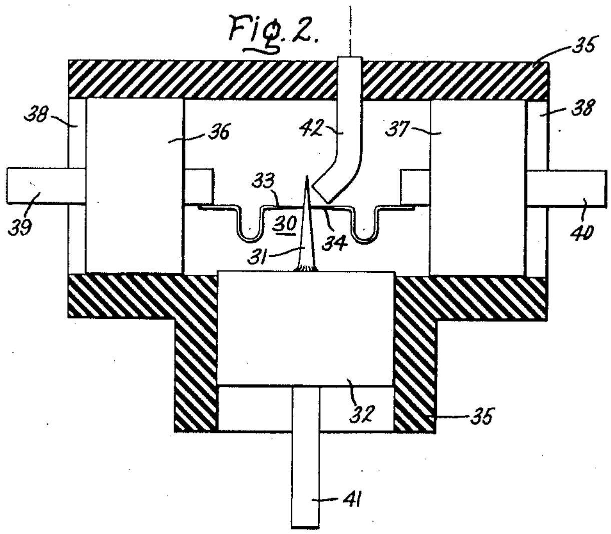

Referring to Fig. 1, I have shown photoelectric apparatus 10 embodying one form of my invention and comprising a point contact semiconductor unit 11 enclosed within a housing or casing 12. Semiconductor unit 11 includes a semiconductor waver 13, preferably germanium, having one face thereof in contact and preferably soldered to a metal conducting plug or base 14, and having a filamentary electrode or "cats-whisker" 15 making point contact with the opposite face of semiconductor wafer 13. For ease of assembly, the point contacting electrode 15 is preferably soldered to a lip 16 of a heavier metallic conducting member 17 which, in turn, is preferably secured in good conducting relation with a metallic cap 18 of housing 12. Cap 18 also functions as a terminal for connection to a suitable utilization circuit or a source of electric potential. The main body of housing 12 is composed of an electric insulating material and preferably is in the form of a hollow cylinder 19 hermetically sealed between cap 18 and plug 14 by any suitable cementitious material so as to completely enclose photoelectric semiconductor unit 11 therewithin. A terminal lead 20 is embedded within plug 14 to provide an electrical connection to the base of germanium wafer 13.

In order to direct a small spot of light upon the point contacting region 21 of germanium wafer 13 and thus to enable an efficient utilization of the photoelectric effects of the germanium material, I provide a light guiding and transmitting pipe or rod 22 which extends from a point adjacent the area to be illuminated through housing 12 to the outside. Rod 22 comprises a solid cylinder of transparent material having a high refractive index, such as quartz or acrylic plastics which are capable of setting up total internal reflections to longitudinally propagated light resulting from substantially axial light rays incident upon an end of the rod. Both ends 23, 24 of rod 22 are cut along planes perpendicular to the longitudinal axis of rod 22 and are highly polished to enable the maximum admittance and transmittance of the light rays. In order to concentrate light upon the external end 23 of rod 22, a suitable optical light focusing system is preferably provided. In Fig. 1, such an optical system is diagrammatically illustrated by light source 25, reflector 26, and focusing lens 27. Light guiding and transmitting rod 22 thereupon functions to transmit the light incident upon edge 23 and project this light as a spot upon the point contacting region 21 of the germanium wafer 13.

Rod 22 is preferably slightly bent at its interior end portion, as illustrated, in order to enable the internal end 24 of rod 22 to be cut in a plane perpendicular to the longitudinal axis of the rod and yet direct the emergent light rays upon the desired area of illumination. As is well known, light will be guided around the bend in rod 22 without leakage as long as the direction of internal incident light rays upon the rod surface exceeds the critical refractive angle of the material from which the rod is composed. A straight rod may alternatively be used but, in this case, the rod would be inserted through casing 12 at an angle and the external end of the straight rod would need to be cut at an angle with respect to the flat outer surface of cap 18. In either case, rod 22 may be extended considerably beyond the outer surface of housing 12, if necessary, in order to enable greater access to edge 23 for illumination purposes.

Rod 22 may be inserted through housing 12 either substantially parallel to the point contacting electrode 15, as shown in Fig. 1, or may be inserted through the side walls comprising cylinder 19 from a direction at substantially right angles to electrode 15. This alternative construction is brought out more clearly in Fig. 2 with reference to the triode photoelectric semiconductor element embodying my invention.

In Fig. 2, a 3-element or "transistor" type photoelectric semiconductor unit 30 comprising a wedge-shape semiconducting member 31, preferably germanium, in large area contact at its base with an electric conducting plug 32 and in point contact on opposite sides of its apex with filamentary electrodes 33 and 34, is enclosed within a supporting housing 35 composed of electric insulating material such as plastic or rubber compounds. Housing 35 is preferably substantially quadrilateral with electric conducting supporting members 36 and 37 for the respective filamentary electrodes 33 and 34 slidably fitted within suitable opposite side apertures 38 of housing 35. Supporting members 36 and 37 are in tight frictional engagement with the side walls of apertures 38 so as to form a completely light impervious housing for the internal semiconductor unit 30. Point contacting electrodes 33 and 34 are secured by such means as soldering to suitable conductors 39 and 40 which extend through supporting members 36 and 37 respectively and serve as terminals for connection in suitable transistor circuits. Conductor 41 makes connection to plug 32 and functions as the electrode base or return conductor for the transistor unit.

In order to illuminate only the point contacting region of electrode 34, hereinafter referred to as the collector electrode, a light guiding and transmitting rod 42 similar to rod 22 of Fig. 1 extends through the top of housing 35 to a point adjacent the top edge of wedge 31 on the collector electrode side of the wedge. Since substantially no light escapes through the sides of rod 42, the germanium wedge 31 is illuminated only at the spot over which light rays emerging from the inner end of rod 42 are projected. The illuminated spot will, therefore, normally be confined to only one side of wedge 31 and extend over the point contacting region of electrode 34.

In the operation of the two-element photoelectric device of Fig. 1, the photoconductive properties thereof may be utilized by supplying a unidirectional or alternating electric voltage in series with a load (not shown) between conductor 20 and terminal cap 18, and the magnitude of resulting substantially constant or rectified electron flow between the semiconductor member and the point contacting electrode in the circuit thus formed may be modified in accordance with the intensity of the illumination supplied to the external end of rod 22. Alternatively, the photovoltaic properties may be utilized by connecting a utilization circuit between the conductor 20 and the terminal cap 18, and a voltage will then be induced across this utilization circuit by the impingement of light upon the point contacting area of semiconductor 13. This induced voltage is dependent in magnitude upon the intensity of the light supplied to the external end of rod 22 and upon the photovoltaic characteristic of the particular germanium wafer 13 employed.

In the operation of the triode photoelectric device of Fig. 3, a small voltage is supplied between conductors 39 and 41 so that a small biasing potential in the easy conducting direction exists between electrode 33, commonly called the "emitter electrode," and germanium wedge 31. The presence of this biasing potential on emitter electrode 33 augments the photoelectric effects existing between collector electrode 34 and the germanium wedge 31. The light impinging upon the point contacting surface of electrode 34 through light guiding and transmitting rod 42 can then be used to control the magnitude of a photovoltaic voltage induced across a utilization circuit connected between conductors 40 and 41. Alternatively, a voltage in a reverse conducting direction can be supplied across conductors 40 and 41 in series with a load, and the magnitude of current flowing in this circuit varied by the photoconductive characteristics of the semiconductor unit according to the intensity of the incident light.

Although I have shown particular embodiments of my invention, many modifications may be made, and I intend by the appended claim to cover all such modifications as fall within the true spirit and scope of my invention.

What I claim as new and desire to secure by Letters Patent of the United States is:

Photoelectric apparatus comprising a germanium wedge, a first electrode in contact with the base of said wedge, a pair of filamentary electrodes making substantially point contact with respective opposite sides of said wedge, a light impervious housing enclosing said wedge and said electrodes, means extending through said housing for making respective connection to said electrodes, and a transparent light guiding and transmitting cylindrical rod having a high refractive index providing substantially total internal reflections to longitudinally propagated light rays and extending from the exterior of said housing through said housing to a point within said housing adjacent the region of point contact of one of said filamentary electrodes, said rod having opposite ends substantially perpendicular to the longitudinal axis of said rod for the admittance and transmittance of internal longitudinally propagated light rays.

THOMAS H. KINMAN.

References Cited in the file of this patent

UNITED STATES PATENTS

| Number | Name | Date |
|---|---|---|
| 2,015,344 | Kosken | Sept. 24, 1935 |
| 2,461,241 | Shann | Feb. 8, 1949 |
| 2,504,627 | Benzer | Apr. 18, 1950 |